Sept. 8, 1959 C. G. ROOT 2,903,153
HEAD CLOSURE CONSTRUCTION FOR HEAT EXCHANGER
Filed March 4, 1957

INVENTOR.
Clarence G. Root
BY
Frease & Bishop
ATTORNEYS

2,903,153
HEAD CLOSURE CONSTRUCTION FOR HEAT EXCHANGER

Clarence G. Root, Canal Fulton, Ohio, assignor to The Griscom-Russell Company, Massillon, Ohio, a corporation of Delaware Application March 4, 1957, Serial No. 643,607

1 Claim. (Cl. 220—46)

This invention relates to heat exchangers and more particularly it pertains to a welded diaphragm head closure for heat exchangers and constitutes improvements upon the head closure construction for heat exchangers disclosed in copending application Serial No. 337,324, filed February 17, 1953, of Frank Boni, Jr., now Patent No. 2,766,903.

Welded diaphragm head closures are desirable for effectively sealing the heat exchanger head chamber, particularly operating under high temperature and pressure conditions, without the use of gaskets. However, the formation of a weld with uniform characteristics, between the diaphragm and barrel wall, involves difficulties.

Also, it is desirable to provide a welded diaphragm head closure construction in which the connection of the diaphragm to the barrel wall has some flexibility or is free to come and go both axially and radially so that the diaphragm and welded joint and connecting means are not adversely affected by expansion and contraction of the heat exchanger under different operating conditions. Further, such flexibility is desired in order that the diaphragm may readily and fully seat against its supporting and back-up head cover without requiring extremely small tolerances to be maintained in the manufacture and assembly of the parts.

Thus, the diaphragm may be subjected to pressures or movement longitudinally of the heat exchanger, such as inward pressure from the head cover when the latter is installed, tending to move the diaphragm inward; or to outward pressure from within the head chamber, tending to move the diaphragm outward.

These conditions may arise incident to the formation of the weld, because of variations in the axial or true radial location of the diaphragm after being welded in place with respect to the inner surface of the head cover when installed. Such variations may result in insufficient or too much clearance between the outer diaphragm surface and the inner head cover surface when assembling the head cover.

Unless there is some flexibility or come and go in the diaphragm connection with the head barrel, additional machining or other operations may have to be performed in order to assemble the equipment.

The welding problems arise in part because of welding a thin diaphragm to a thick barrel wall. Under such conditions it is difficult to control and maintain uniform dissipation of heat from the weld, to the thin diaphragm and the thick wall, without which control it may be impossible to obtain or maintain the desired mechanical properties in the metal in the diaphragm and barrel wall adjacent the weld.

These difficulties may be overcome by the improved construction of the connection between the diaphragm and the barrel wall, in which the barrel wall is provided with an annular finlike angular flange extending from the inner surface of the barrel wall to which the periphery of the diaphragm is welded. The finlike angular flange provides a flexible construction which can come and go radially and axially to accommodate variable conditions and provide ideal welding conditions.

Accordingly, it is a general object of this invention to provide a head closure construction for a heat exchanger that overcomes the various difficulties heretofore encountered in creating and maintaining a sound peripheral weld between the closure diaphragm and head barrel wall of a heat exchanger.

Another object of the present invention is to provide a welded diaphragm closure construction for a heat exchanger that is sufficiently flexible to come and go with expansion and contraction of the various members of the heat exchanger in operation under various operating conditions of pressure and temperature.

Also an object of the present invention is to provide a welded diaphragm closure construction for heat exchangers with which close tolerances need not be maintained in the manufacture and assembly of the closure.

Another object of the present invention is to provide a welded diaphragm closure construction for a heat exchanger with a finlike angular welding flange on the head barrel wall which accommodates stresses that may arise between the head barrel wall and the diaphragm.

Finally, it is an object of this invention to provide an improved head closure construction for a heat exchanger which incorporates the foregoing desiderata in an inexpensive manner and with simplified maintenance and operation.

These and other objects and advantages apparent to those skilled in the art from the following description and claim may be obtained, the stated results achieved and described difficulties overcome by the discoveries, principles, apparatus, parts, combinations, subcombinations and elements which comprise the present invention, the nature of which is set forth in the following statement, preferred embodiments of which, illustrative of the best modes in which applicant has contemplated applying the principles, are set forth in the following description, and which are particularly and distinctly pointed out and set forth in the appended claim forming part hereof.

The head closure construction for heat exchangers of the present invention may be stated generally as including in a heat exchanger, a barrel wall forming a head chamber, a finlike angular flange extending inwardly of the barrel wall, a preferably flat thin-walled metal diaphragm having inner and outer surfaces, the diaphragm being welded continuously about its periphery to the finlike angular flange, the connection of the finlike flange with the barrel wall having substantially the same thickness as the diaphragm thickness, a cover plate having a flat inner surface abutting the flat outer surface of the diaphragm, and means engaging the cover plate and barrel wall for removably securing said cover plate to the barrel wall in pressure-supporting engagement with the diaphragm.

By way of example, the improved heat exchanger head closure construction is shown in the accompanying drawings in which.

Similar numerals refer to similar parts throughout the several views of the drawing.

Figure 1:
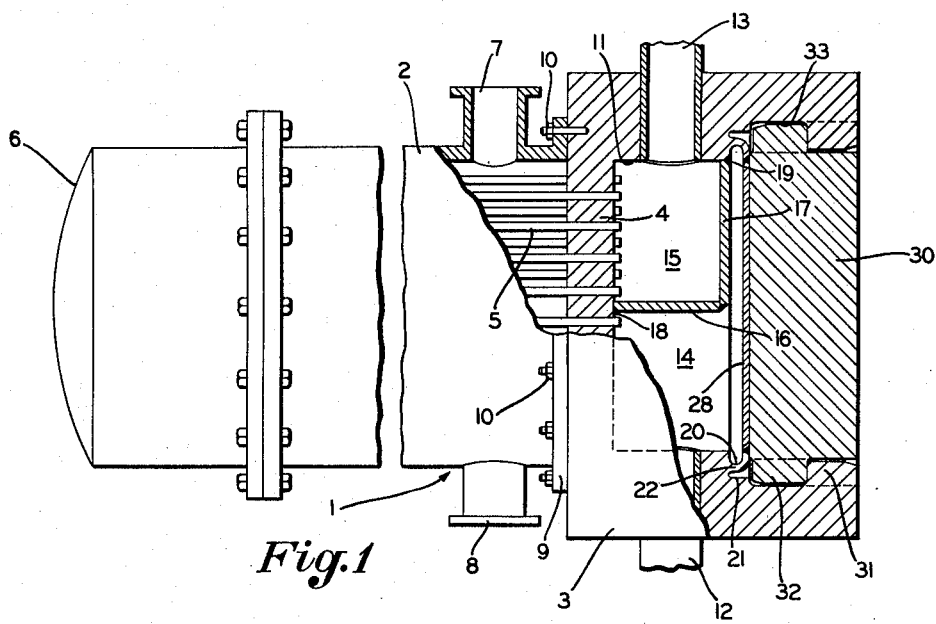
Fig. 1 is a vertical sectional view, partly in elevation, of one embodiment of the present invention.

In Fig. 1 a heat exchanger is generally indicated at 1 and it includes a shell 2 and a head member 3 which are separated by a tube sheet 4. A plurality of tubes 5 extend from the tube sheet 4 into the shell 2. The tubes 5 communicate with the interior of the head member 3, For the purpose of illustration, the end of the shell 2 opposite the head member 3 is rounded at 6, indicating that the tubes 5 are U-shaped. Thus, the heat exchanger 1 is a U-tube heat exchanger. However, it is intended that the type of heat exchanger here involved be not limited to the U-tube type.

The shell 2 includes a fluid inlet 7 and a fluid outlet 8. The shell 2 is provided with an annular flange 9 to which the head member 3 is connected by bolts 10. The head member 3 includes a head chamber 11 having a fluid inlet 12 and a fluid outlet 13. The chamber 11 is divided into incoming and outgoing fluid compartments 14 and 15, respectively, by baffle partitions 16 and 17. The partition 16 is secured to the head side of the tube sheet 4 in a fluid-tight manner, such as by a weld 18, and similarly at opposite ends to the inner surface of the head member 3.

Similarly, the partition 17 is mounted in abutment with one side of the chamber 11 where it is secured by a weld 19 in a fluid-tight manner. Thus, fluid entering the inlet port 12 passes from the incoming compartment 14 through the U-tubes 5 to the outlet going compartment 15 and the outlet 13.

Figure 2:
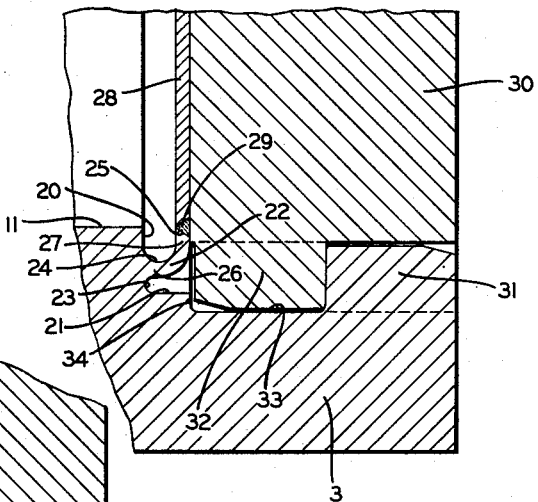
Fig. 2 is an enlarged fragmentary vertical sectional view of the embodiment shown in Fig. 1.

A trepan groove 20 is formed in the surface of the barrel wall 3, as shown in Fig. 2, opening radially inwardly of the barrel wall; and a generally V-shaped axially opening trepan groove 21 is formed in the barrel wall 3 extending from the cover lug receiving groove 33 to be later described. The grooves 20 and 21 thus form a curved, angular, finlike, annular flange 22 connected by fillets 23 and 24 at the bases, respectively, of the grooves 21 and 20, with the barrel wall 3; and the inner end 25 of the flange 22 has a diameter approximately equal to that of the chamber 11.

Thus, the finlike angular flange 22 includes a cylindrical portion 26 extending from the fillet corners 23 and 24 and a radial portion 27 joined with the portion 26 by a curved portion. The radial portion 27 and the end 25 of flange 22 are preferably disposed perpendicular to the axis of the barrel wall.

The open end of the head member 3 remote from the tube sheet 4 is closed by a thin-walled flexible flat metal diaphgram 28 of uniform thickness. The diaphragm 28 has a diameter substantially equal to that of the chamber 11, as well as to that of the extremity 25 of the flange 22. The diaphragm 28 and the flange 22 are welded together annularly at 29 whereby a fluid-tight connection is provided between the inner and outer sides of the diaphragm 28.

As shown, the diaphragm 28 and finlike flange 22 have substantially the same thickness. Such arrangement avoids welding difficulties because the same thickness of metal on either side of the weld 29 enables heat to be dissipated from the weld uniformly from either side of the weld so that the weld metal and the metal adjacent thereto has substantially the same characteristics and the desired mechanical properties can be maintained therein. Such conditions are difficult to maintain where a thin plate is welded to a thick wall.

The angular arrangement of the portions 26 and 27 joined by a curved portion provides flexibility for the finlike flange 22 so as to enable the assembly to come and go with expansion and contraction when the heat exchanger is in operation.

The rounded fillet corners 23 and 24 at the base of the angular finlike flange 22 assist in transmitting stresses from the diaphragm 28 to the barrel wall.

Since the finlike flange 22 prior to welding the diaphragm 28 thereto has a diameter equal to that of the chamber 11, maximum access may be had to the tube sheet 4 for the location and connection of tubes therein. In other words, the improved welded diaphragm closure construction does not in any manner change the amount of tube space available, or the barrel or cover wall thicknesses for a given design of heat exchanger and cover member.

The cover member 30 is mounted in the open end of the head member 3 and is secured in place by conventional means which may include spaced lugs 31 extending radially inwardly of the head barrel wall and similarly spaced lugs 32 extending radially outwardly from the cover member 30. The head barrel wall 3 is provided with an annular groove 33 between the flange 22 and the lugs 31. The groove 33 includes a wall or shoulder 34 which is in substantial alignment with the interface of the diaphragm 28 and the inner surface of the cover 30. The lugs 32 of the cover 30 are disposed in the groove 33 and adapted to turn into locking engagement with the lugs 31, as shown in Fig. 1.

Figure 3:
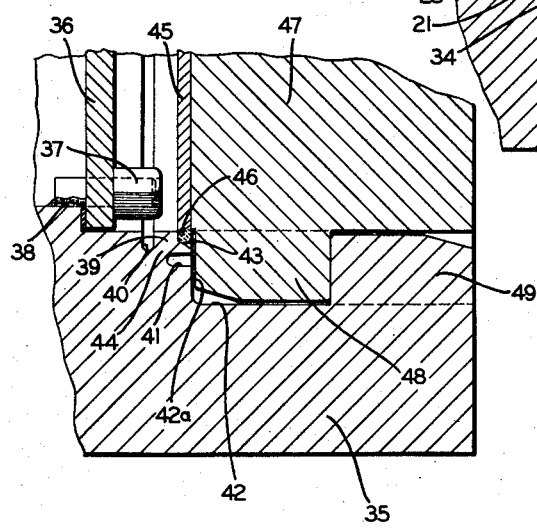
Fig. 3 is a fragmentary sectional view of another embodiment of the invention.

Another embodiment of the invention is shown in Fig. 3, and includes a head member 35 similar to the head member 3. A partition 36, similar to the partition 17, is provided within the head member 35 and is secured in place by a nut and bolt assembly 37 which is welded at 38 to the inner surface of the head member.

The head member 35 also includes an angular finlike flange portion 39 which has a somewhat rectangular cross section formed in a zone of the barrel wall adjacent annular groove 42 by annular trepan grooves 40 and 41. The groove 42 includes a wall or shoulder 42a similar to the wall or shoulder 34 in Fig. 2. The groove 40 opens radially inwardly of the head member 35, while the trepan groove 41 is circumferentially disposed and opens outwardly toward the open end of the head member and into the annular groove 42 in the inner surface of the head member 35. Thus the finlike flange 39 is joined with the head member barrel wall 35 by a thin annular, angular neck 44 which has substantially the same thickness as the thickness of the diaphragm 45 for reasons previously described.

As shown in Fig. 3, the angular flange 39 is provided with an annular notch 43 in which the periphery of a diaphragm 45 is seated and held in place while the diaphragm is welded at 46 to the flange 39. In other respects the embodiment of the invention shown in Fig. 3 is similar to that of Fig. 2. Thus, a head cover member 47 having spaced peripheral lugs 48 seated in the groove 42 and in abutment with similar lugs 49 spaced around the opening of the head member 35, is in abutment with and supports the outer surface of the diaphragm 45 and is coextensive therewith.

Though the shape of the flange portion 39 differs from that of the flange 22, their functions are similar in that both are welded to the outer periphery of an end closing diaphragm for a head chamber of a heat exchanger. Both flange portions 22 and 39 are adapted to yield radially and longitudinally to accommodate various conditions of pressure and temperature changes and to facilitate welding. Both are joined to the barrel wall by an angular connection having substantially the same thickness as the thickness of the diaphragm so that when the welded joint is formed, welding heat will be dissipated uniformly from the weld from either side thereof. Both have fillet connections with the barrel wall to readily transfer stresses from the diaphragm to the barrel wall.

The head closure construction for heat exchangers of the present invention is an improvement over previous constructions in that the attachment of the diaphragm by welding to a finlike annular flange integral with the wall of the head member is susceptible to yielding in response to pressures or forces applied to the diaphragm in various directions. By such a construction the flexible flange absorbs and yields to whatever expansion or contraction stresses to which it may be subjected without damage to the weld between the diaphragm and the flange. In both embodiments the flange is adapted for slight movements either radially or longitudinally of the heat exchanger chamber.

Finally, the finlike flange welded diaphragm construction in both embodiments of the invention illustrated may be used with the lug type cover member illustrated without reducing the tube space available in the head barrel chamber or without increasing the barrel wall size and thickness, in any given heat exchanger.

In the foregoing description certain terms have been used for brevity, clearness and understanding, but no unnecessary limitations are to be implied therefrom beyond the requirements of the prior art, because such words are used for descriptive purposes herein and are intended to be broadly construed.

Moreover, the embodiments of the improved construction illustrated and described herein are by way of example, and the scope of the present invention is not limited to the exact details of construction shown.

Having now described the features, constructions and principles of invention, the characteristics of the new heat exchanger head closure construction, and the advantageous, new and useful results provided; the new and useful discoveries, principles, parts, elements, combinations, subcombinations, structures and arrangements, and mechanical equivalents obvious to those skilled in the art, are set forth in the appended claim.

I claim:

Head closure construction for heat exchangers, including an annular metal head barrel wall, said wall terminating in an annular open end, the wall having radially and axially opening trepan grooves, said trepan grooves forming a flexible finlike flange extending integrally inwardly of the barrel wall between the grooves, a thin-walled metal diaphragm, the diaphragm being welded to the flange continuously about the diaphragm periphery, the flange being joined with the barrel by a thin angular neck having substantially the same thickness as that of the diaphragm, the angular flange neck being angularly located with respect to the diaphragm to permit the flange to come and go axially and radially in response to varying conditions of temperature and pressure, a cover plate supporting the diaphragm, and means removably securing the cover plate to the barrel wall in pressure-supporting engagement with the diaphragm.

References Cited in the file of this patent

UNITED STATES PATENTS

| | | |
|---|---|---|
| 2,219,659 | Price | Oct. 29, 1940 |
| 2,301,061 | Logeman | Nov. 3, 1942 |
| 2,647,656 | Frisch | Aug. 4, 1953 |
| 2,684,173 | Schmitz | July 20, 1954 |
| 2,766,903 | Boni | Oct. 16, 1956 |